United States Patent [19]

Morse et al.

[11] 4,030,112
[45] June 14, 1977

[54] ACCESSORY ADAPTER FOR CAMERAS

[75] Inventors: John B. Morse, Boston; Donato F. Pizzuti, Saugus; John M. Reynard, Framingham, all of Mass.

[73] Assignee: Polaroid Corporation, Cambridge, Mass.

[22] Filed: Jan. 13, 1976

[21] Appl. No.: 648,653

[52] U.S. Cl. .............................................. 354/269
[51] Int. Cl.² ...................................... G03B 17/38
[58] Field of Search .......... 354/240, 295, 266, 267, 354/269; 352/178, 179

[56] References Cited

UNITED STATES PATENTS

| | | | |
|---|---|---|---|
| 2,650,501 | 9/1953 | Murray | 354/295 X |
| 3,357,332 | 12/1967 | Helber et al. | 354/269 |
| 3,831,184 | 8/1974 | Morse | 354/240 |

FOREIGN PATENTS OR APPLICATIONS 850,953  9/1939  France ............................... 354/269

Primary Examiner—Donald A. Griffin
Attorney, Agent, or Firm—John W. Ericson; John S. Vale

[57] ABSTRACT

A quick release adapter for connecting a cable release or self-timer to a camera and applying a shutter operating force to the shutter button of the camera. The force transmitting mechanism includes an overtravel spring to minimize malfunctions that might occur because of differences in tolerances between cameras, adapters and accessories. The adapter comprises a housing embracing the lensboard of the camera and being detachably connectable to the camera by means of a cam operated latch.

3 Claims, 9 Drawing Figures

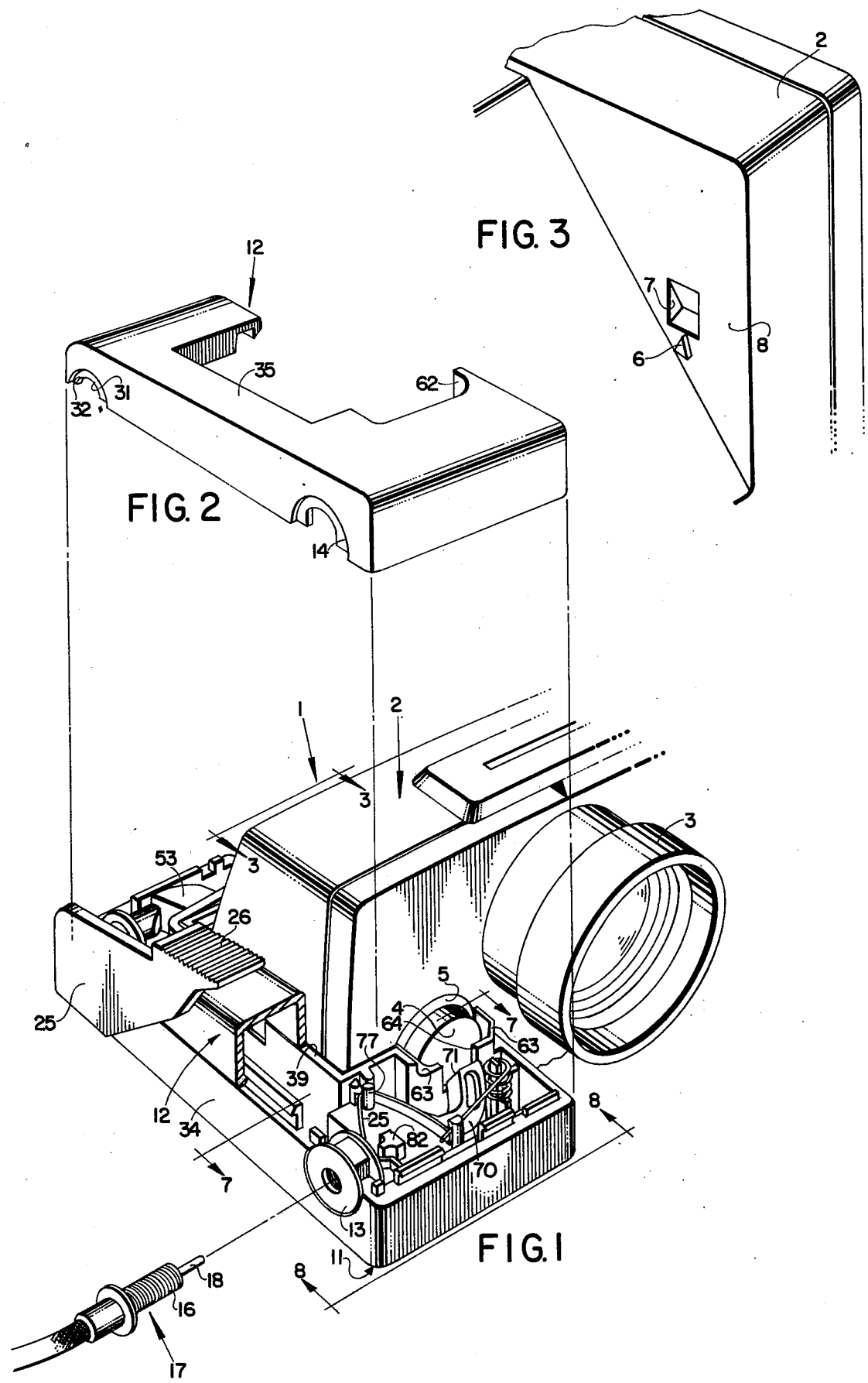

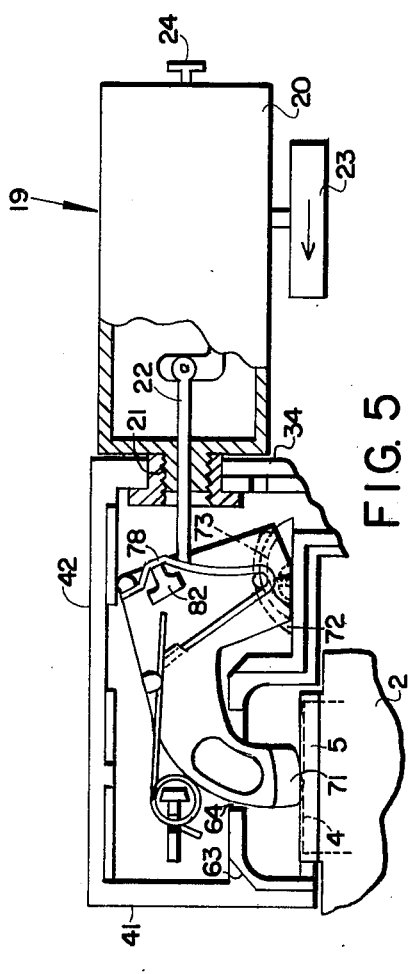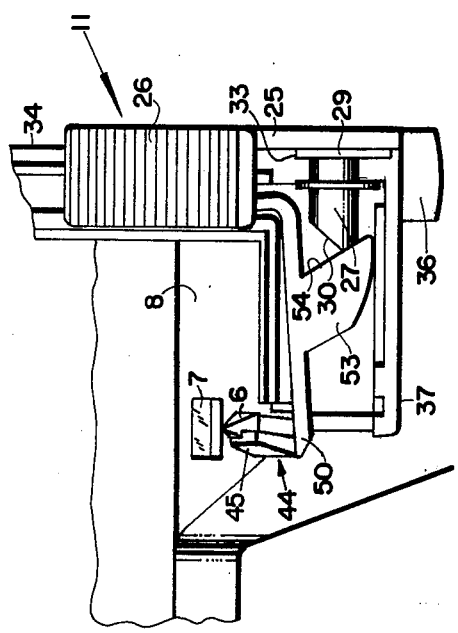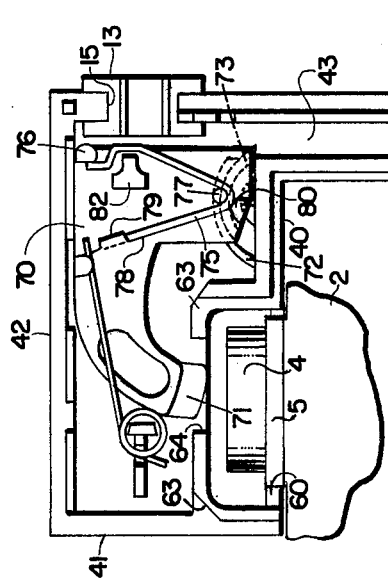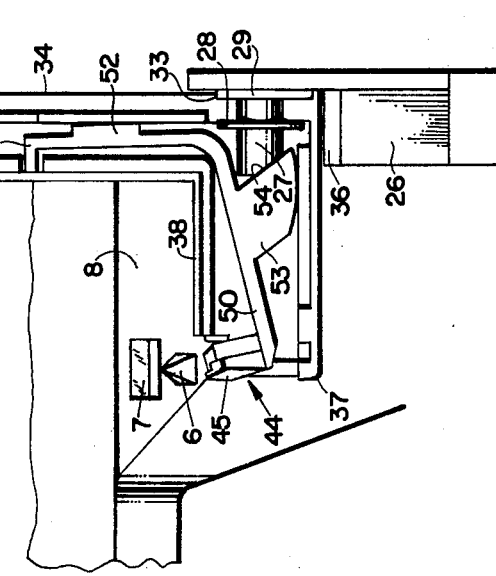

ACCESSORY ADAPTER FOR CAMERAS

This invention relates to photography, and particularly to a novel accessory adapter for cameras.

The cable release is a popular camera accessory which permits the shutter of the camera to be released with a minimum of movement and vibration. Cable releases have long been standardized, and many cameras are made with cable release sockets. For those cameras which do not initially have cable release sockets, various adapters have been proposed for detachably mounting a cable release socket on a camera. One such device is shown in U. S. Pat. No. 1,273,172, granted on July 23, 1918 to P. J. Marks for "Detachable Shutter Releasing Device". Another form of demountable cable release adapter is shown in U. S. Pat. No. 2,982,194, granted on May 2, 1961 to J. J. Hannafin for "Horizontal Release for Cameras". Various accessories other than the cable release have been developed for releasing the shutter of a camera by way of the cable release socket. Among these are remote electromagnetic actuators, such as shown in U. S. Pat. No. 1,247,902, granted on Nov. 27, 1917 to K. W. Thalhammer for "Electromagnetic Controlling Device for Camera Shutters". Another is a delayed action timing device. Such devices enable the photographer to get into his own picture. Examples of such constructions which are adapted to screw into a cable release socket are shown in U. S. Pat. No. 1,209,745, granted on Dec. 26, 1916 to W. H. Morris for "Camera Operating Device", and in U. S. Pat. No. 3,350,992, granted on Nov. 7, 1967 to F. W. R. Starp et al. for "Delayed Action Timing Device". It will be appreciated from a review of these patents that when one of these devices is installed, fairly substantial moments are exerted on the camera, particularly when the timing device is being wound. One object of this invention is to provide a quickly detachable adapter for mounting a relatively massive accessory such as a self-timer on a camera such that it is firmly held against movement in use, but can be quickly detached from the camera.

Since conventional self-timers are made to be used with a variety of cameras, the forces produced by their actuating elements are fairly large. Camera shutters vary markedly in their operating force requirements from type to type, and even between cameras of the same manufacture and construction, differences due to manufacturing tolerances occur. The result is that the timer is capable of exerting sufficient force to damage the camera if it is installed in such a way that it can jam against an operative part of the camera. This kind of damage can also occur with a conventional cable release if too much pressure is put on the release by the operator. Another object of this invention is to provide an adapter for mounting a cable release or a self-timer on a camera with a greatly reduced probability of failures of this kind.

One form of self-timer that has been proposed is incorporated in a housing that fits around three sides of the lensboard and shutter housing of a camera and includes the plunger which operates the shutter button. In many cameras, the shutter button is mounted with a surrounding bezel, protruding more less above or forwardly of the bezel in the unoperated position, and being depressed below or slightly rearwardly of the bezel when operated. The plunger of such a device is inserted to release the shutter, and if the apparatus jams for any reason such that the timer cannot complete its stroke and withdrawn, the plunger in the bezel becomes a further point of attachment for the device and it may be very difficult or impossible to take the device off the camera. A self-timer of this type is shown in U. S. Pat. No. 3,831,184, granted on Aug. 20, 1974 to John B. Morse for "Self-Timer Attachment for a Camera" and assigned to the assignee of this application. A further object of this invention is to reduce the probability of malfunction or damage to the camera or accessories.

Briefly, the above and other objects of the invention are attained with a novel adapter construction incorporating a housing adapted to extend about the lensboard and shutter housing of a camera where it is releasably secured by a cam operated latch which engages a detent formed on the camera body. A cable release socket, mounted in the housing, is adapted to receive any accessory shutter operating device that is suited for use with conventional cable release socket. Within the housing and communicating with the cable release socket is a force transmitting system comprising a lever or plunger pivoted in the housing and formed with a cam at one end that is adapted to be inserted through an opening in the housing to depress the shutter actuator of the camera. A spring mounted on the lever is adapted to be engaged by the actuator of a cable release or the like, and when so actuated drives the plunger to operate the shutter actuator. The combination of the cam on the plunger with the spring in the force transmitting linkage allows the apparatus to be removed from the camera even though the plunger becomes jammed in the operated position, and the spring allows the timer to complete its stroke and reset even though the plunger may be jammed before it reaches its fully actuated position.

The manner in which the apparatus of the invention is constructed, and its mode of operation, will best be understood in the light of the following detailed description, together with the accompanying drawings, of a particular preferred embodiment of the invention.

In the drawings,

FIG. 1 is a fragmentary schematic perspective sketch, with parts omitted and parts broken away, of an accessory adapter in accordance with the invention attached to a camera;

FIG. 2 is a schematic perspective sketch of the top cover of the adapter of FIG. 1;

FIG. 3 is a fragmentary schematic perspective sketch showing the rear of the wall of the lens and shutter housing of the camera of FIG. 1, taken substantially along the lines 3—3 in FIG. 1;

FIG. 4 is a schematic plan view, on an enlarged scale, of the adapter of FIG. 1 with its cover removed;

FIG. 5 is a fragmentary elevational view of a portion of the apparatus of FIG. 4 showing a self-timer attached to the adapter and with the apparatus in its fully extended position;

FIG. 6 is a fragmentary plan view of a portion of the apparatus of FIG. 4, showing the parts in another position with the latch engaged;

Figure 9:
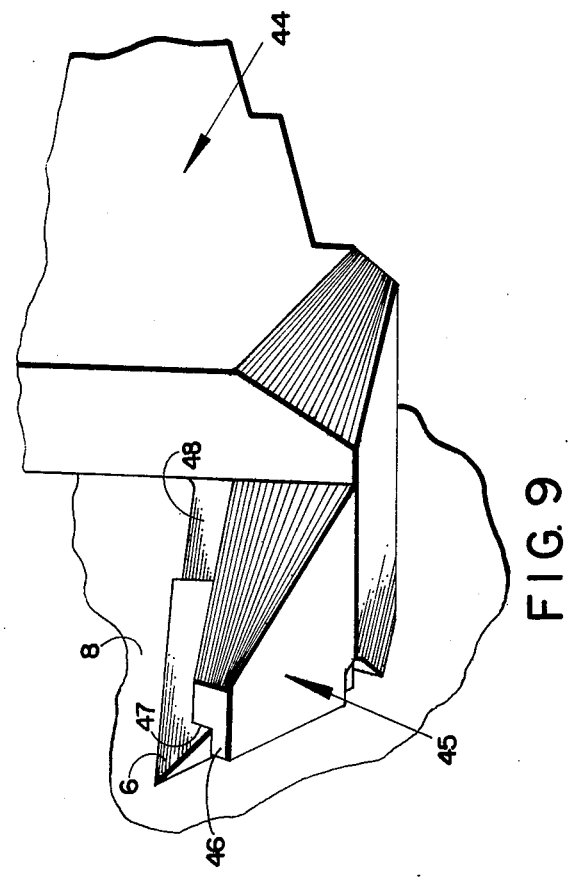
FIG. 9 is a schematic fragmentary perspective sketch of the latch portion of the adapter of the invention showing its manner of engagement with a detent on the wall of the camera, on an enlarged scale.

FIG. 1 shows schematically a camera 1, which may be of any conventional construction except in any particular respects to be herein described. The camera is shown as having a lens and shutter housing 2 on which there is mounted a conventional objective lens 3. A shutter actuator or button 4 of conventional construction is mounted for movement on the lensboard between a position shown in FIG. 1 and a position to the rear of that shown and within a surrounding bezel 5.

An adapter in accordance with the invention comprises a housing 10 including a base member 11 and a top cover 12. A portion of the top cover 12 is shown broken away in FIG. 1 to illustrate the operative relation of certain of the parts.

As shown in FIG. 3, the lensboard and shutter housing 2 of the camera 1 is provided with a generally rearwardly sloping rear wall 8 on which there is formed integrally a generally pyramidal detent 6. This detent 6 is in the shape of an arrow head and also serves as an indicator pointing to a window 7 which may be provided to display a number such as the number of film units remaining in the camera. This detent 6 serves as one point of attachment for the adapter of the invention in a manner to be described.

A cable release socket 13 is mounted on the housing and comprising a threaded metal insert fitting into complementary recesses, comprising the recess 14 in the side wall of the top cover 12 and a complementary recess 15 formed in the base member 11 as shown in FIG. 4. Insert 13 is threaded in the conventional manner to accept the standard thread 16 of a cable release generally indicated at 17, and having an actuating rod 18. The socket 13 is also obviously adapted to receive other accessories, such as the conventional self-timer 19 shown in FIG. 5 in attached position.

Self-timer 19 may be of any conventional construction, having a housing 20 in which there is suitable timing mechanism, such as that shown, for example, in U.S. Pat. No. 3,831,184 cited above. The output element of the timer is connected to an actuating rod 22. When the timing mechanism is wound up with a knob 23, and the release button 24 subsequently pressed, the timer will respond in a conventional manner after a predetermined time delay to advance the rod 22 from a position to the right of that shown on FIG. 5 to the position shown on FIG. 5 and then rapidly withdraw it.

Comparing FIGS. 1, 4 and 5, the adapter in accordance with the invention is adapted to be detachably secured to the camera 1 by means of a cam operated latch comprising a locking arm 25. The locking arm 25 is formed integral with a thumb piece 26 and a cam shaft 27. Flanges 28 and 29 are formed integral with the cam shaft 27. The cam shaft 27 is cut off at an angle as indicated at 30 to form a cam face. The locking arm 25 is journalled in the housing in cooperating hemispherical bores such as 31 in FIG. 2 surrounded by annular grooves such as 32 in FIG. 2, and corresponding grooves such as the one indicated at 33 in FIG. 6, formed in the outer side wall 34 on the base member 11. The locking arm 25 is thus adapted to rotate in the housing between its fully latched position, shown in FIGS. 1 and 6, and its fully released position, shown in FIG. 4.

The locking arm 25 is stopped in its fully latched position by engagement of the lower side of the thumb piece 26 with the upper wall 35 of the top cover 12, as will be apparent from FIG. 1. The locking arm 25 is stopped in its fully released position by a stop 36 formed integral with the lower righthand corner of the rear wall 37 of the base member 11, shown in FIGS. 4 and 6.

Comparing FIGS. 2 and 4, the top cover 12 and base member 11 together form a generally U-shaped housing with one arm of the U considerably longer and wider than the other. As shown in FIG. 4, the base member 11 defines this channel by side wall 34, rear wall 37, inner rear wall 38, inner side wall 39, inner front wall 40, an end wall 41, a front wall 42, and the bottom wall 43 of the housing 11. Cooperating walls of the top cover 12 complete the housing in a manner that will be sufficiently apparent from the drawings.

As shown in FIG. 4, in the rear L-shaped portion of the housing formed by the walls 34, 39, 37 and 38, there is disposed a resilient latch spring generally designated 44, which may be injection molded of any convenient synthetic resin or the like, which terminates in a latching end portion 45 protruding from an opening in the housing.

As best shown in FIG. 9, the end 45 is shaped to conform to the inside rear corner of the pyramidal detent 6 and for that purpose is provided with a side wall portion 46, a rear wall portion 47, and a bottom wall portion 48 which together capture the corner of the detent 6.

The end 45 extends over an arm 50 to an integral tab portion 51 caught on a suitable notch formed in the inner wall 39. A pad 52 formed integrally with the arm 50, and bearing against wall 34, serves as a fulcrum for the spring 44. A cam portion 53 formed integrally with the spring 44 has a cam face 54 adapted to cooperate with the cam face 30 formed on the end of the output shaft 27 of the locking arm 25.

Figure 7:
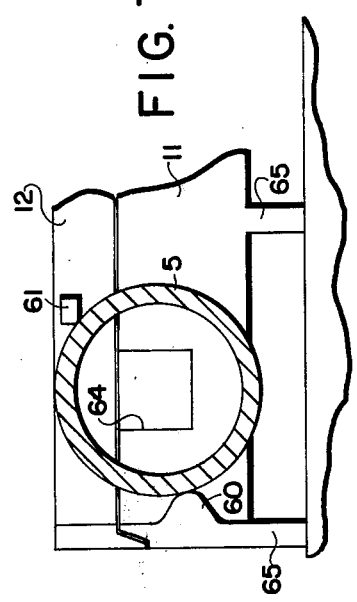
FIG. 7 is a fragmentary schematic front view of a portion of the apparatus of FIG. 1, with the parts broken away; taken substantially along the lines 7—7 of FIG. 1.
Figure 8:
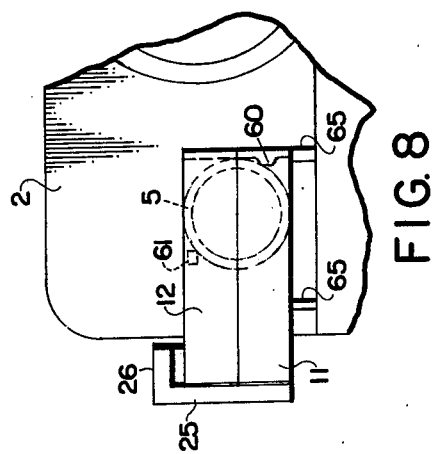
FIG. 8 is a fragmentary schematic rear view, with parts broken away and with the position of the bezel indicated in dotted lines, taken substantially along the lines 8—8 in FIG. 1.

As shown in FIGS. 4, 7 and 8, a bezel engaging tab 60 is formed integral with the housing 11 and in the position of the parts with the actuator latched onto the camera, it engages the bezel below center. A corresponding bezel engaging tab 61 is formed on the top cover 12, as indicated in FIGS. 4 and 8. The bezel 5 and the shutter actuator button 4, in its fully extended position, are received in a bay formed in the housing by a curved wall 62 in a top cover 12 as shown in FIG. 2, and a corresponding curved wall 63 formed in the base 11 as indicated in FIGS. 1 and 4.

Curved wall 63, in the base member 11, is pierced with an aperture 64 through which the actuating plunger of the apparatus, to be described, is exposed.

Edges of walls 62 and 63 preferably closely conform to and may be slidably received by the bezel in the engaged position of the apparatus. The tabs 60 and 61 locate the bezel against the wall of the bar at the right as seen in FIG. 8, so that a 3 point anchor to the bezel is provided.

Legs 65 formed integral with the base member 11, as shown in FIGS. 7 and 8, are preferably shown as small integral tabs protruding downwardly from the bottom of the base member 11 and engage the apron 67 of the camera at its junction with the front panel 66 of the lensboard and shutter housing 2.

Referring to FIG. 4, with the adapter in its fully engaged position as shown and the locking arm 25 in its fully released position as shown, there is sufficient clearance between the latch end 45 of the spring member 44 and the detent 6 to allow the adapter to be pushed forward until the tabs 60 and 61 are disengaged from the bezel 5, allowing the adapter apparatus to be rocked up and removed from the camera. On the other hand, with the adaptor housing in a position shown in FIG. 4 and the latch end 45 engaged with the detent 6 as shown in FIGS. 6 and 9, the adaptor housing is resiliently urged into full latched engagement under the force of the spring 44.

Comparing FIGS. 1, 4 and 5, a force transmitting linkage is provided in the housing comprising a lever generaly designated 70 having a cam faced plunger portion 71 formed at one end thereof. Plunger 71 is formed at its forward face with a tapering surface as shown, so that it can be cammed up out of the bezel 5 if caught thereunder in a manner to be described below.

The lever 70 is partially journalled for rotation in the housing by means of a curved rib 72 formed integral with the bottom wall 43 of the base member 11 and a cooperating curved rib 73, shown in FIG. 5, formed integral with the base of the lever 70 and extending downwardly therefrom. The ribs 72 and 73 define an axis for rotation for the lever 70 that is somewhat outside of the housing, allowing for a lever ratio such that, for example, the plunger 71 moves 1.67 times the motion imparted to the lever 70 by the actuating rod 18 of the cable release 17 in FIG. 1 or the corresponding actuating rod 22 of the self-timer 19 in FIG. 5.

Such rotation is, at times, transmitted to the lever 70 through an intermediate overtravel spring 75 retained on the lever by a system of posts comprising a first post 76 formed integrally with and extending upwardly from the lever 70 in FIG. 4, a second post 77 around which the spring is bent and then compressed against a ledge 78 formed integral with an outstanding portion of the lever 70. A projecting ledge 79, of plunger portion 71, lies over the spring 75 and traps it at the end. Locating posts 80 confine the spring 75 against dislodgement during assembly.

Spring 75 is designed to be sufficiently stiff that it will not be appreciably compressed under a force sufficient to operate the camera for which the adapter is designed in the worst case combination of tolerance accumulations. Self-timer 19 is preferably selected to produce an appreciably greater force, such that if the plunger 71 becomes jammed, the actuating rod 22 of the self-timer can complete its forward stroke by bending the spring 75 to the limit until it engages a trapping post 82 formed integral with the lever 70.

FIG. 5 shows the parts in position of maximum extension with the plunger 71 down inside the bezel 5. If, due to a combination of tolerances, the shutter button 4 has bottomed out against a mechanical obstruction before the self-timer 19 has driven the rod 22 to the position in which it is reset, a problem will arise whose solution may not be readily apparent to the user. If he solves it by rewinding the knob 23 of the timer thereby causing rod 22 to retract, that will allow the lever 70 to be retracted and the apparatus can then be removed from the camera.

However, it may not occur to him to do this. Two provisions are made to prevent difficulties arising from this cause. One of them is the provision of the overtravel spring 75 that will normally be given sufficient force from the timer to bend over and allow the timer to complete its stroke. Another factor is the cam surface formed on the plunger end 71 of the lever 70, which will allow the plunger to be cammed up and out of the bezel 5 by deflecting the spring 75, either of which will allow the apparatus to be removed from the camera.

In the installation of the adapter in accordance with the invention, the housing is first slipped down over the lensboard and shutter housing 2 of the camera with the housing portion such as the base member 11 above the position shown in FIG. 4, such that the tabs 60 and 61 are clear of the bezel 5, and with the locking arm 25 in its fully released position as shown in FIG. 4, but higher and nearer to the detent 6. The adapter is then slid down until the legs 65 in FIG. 7, for example, engage the apron 67 of the camera, whereupon the locking arm 25 is raised from the position shown in FIG. 4 towards the position shown in FIG. 6. At approximately 90°, in other words when the thumb piece 26 is standing directly normal to the plane of FIG. 4, rotation of the cam shaft 27 will cause the cam 30 to drive the cam portion 53 formed on the spring 44 to its maximum position as shown in FIG. 6. Further rotation of the locking arm 25 to the position shown in FIG. 6 will not cause any further travel of the spring, and the latch ends 45 will remain firmly in engagement with the detent 6 and there locked by the irreversible action of the locking arm 25. During the latching movement, the forward end of the housing will be pulled firmly down against the front wall of the camera. The adapter will engage the camera also on the walls 38, 39 and 40. When it is desired to release the adapter, before or after removal of the accessory such as the cable release or self-timer, all that is necessary is to return the locking arm 25 to the position shown in FIG. 4, whereupon the adapter can be pushed forward and lifted off of the housing.

While the invention has been described with reference to the details of a particular embodiment thereof, many changes and variations will occur to those skilled in the art upon reading this description. Such can obviously be made without departing from the scope of the invention.

Having described the invention, what is claimed is:

1. An adapter for connecting a cable release to a camera of the kind having a housing including a front panel on which a shutter actuating button is mounted, a side panel adjoining the front panel, and a rear panel adjacent the side panel and behind the front panel, the rear panel having a detent formed thereon, said adapter comprising means forming an adapter housing adapted to embrace the three panels of the camera, means forming a cable release socket in said adapter housing, force transmitting linkage extending in said adapter housing from said cable release socket to an opening in said adapter housing confronting the shutter actuating button of the camera when the adapter is in operative position on the camera, said force transmitting linkage comprising a lever in said adapter housing and having one end thereof terminating in a plunger adapted to engage the shutter actuating button of the camera, and a spring connected to said lever and adapted to be engaged by a push rod of a device coupled to said cable release socket to drive said plunger into shutter button actuating position but also to yield and allow further movement of the push rod should said plunger meet an obstruction.

2. The apparatus of claim 1, further comprising a cam operated latch for engaging said detent.

3. An adapter for releasably coupling an accessory device to a camera having a shutter actuating button mounted on a first wall of the camera for translation in a bezel protruding from the first wall and having a protruding detent formed on a second wall of the camera disposed opposite the first wall of the camera, said adapter comprising means forming an adapter housing having first and second confronting wall portions spaced further apart than the distance between the first wall of the camera and the detent on the second wall of the camera, at least one detent formed integral with said first wall portion of said adapter housing being configured to engage a portion of the bezel protruding from the first wall of the camera, and a cam actuated latch movable relative to the second wall of the adapter housing between a latching position wherein said latch protrudes forwardly of said second adapter wall section toward said first wall portion and engages the detent on the second wall of the camera to releasably secure said adapter housing to the camera and an unlatching position wherein said latch is retracted from said latching position toward said second wall portion of the adapter housing so that said adapter housing may be uncoupled and removed from the camera.

* * * * *